United States Patent Office 2,997,394
Patented Aug. 22, 1961

2,997,394
YEAST-RAISED BAKED PRODUCTS, AND METHOD OF MAKING SAME, AND COMPOSITION EMPLOYED THEREIN
Daniel Melnick, Teaneck, and Hans W. Vahlteich, Englewood, N.J., and Raymond T. Bohn, Scarsdale, N.Y., assignors to Corn Products Company, a corporation of Delaware
No Drawing. Filed Jan. 21, 1958, Ser. No. 710,194
18 Claims. (Cl. 99—90)

This invention relates to novel compositions as well as to an improved method of preparing baked products from yeast-raised doughs.

This is a continuation-in-part of application Serial No. 443,966, filed July 16, 1954.

In the manufacture of yeast-raised baked products, three types of microbiological material or microorganisms are of concern. One of these is yeast which produces gas in fermenting sugar and thereby contributes leavening action to the dough. Such microorganisms should not be inhibited, since proper leavening is essential to bread manufacture. The second type of microorganisms is of the class which includes *Bacillus mesentericus*. The spores of these microorganisms are not destroyed in baking. They become active in the baked product and contribute to off-flavors and to an undesirable pasty texture, i.e. the so-called "rope" formation, in bread. The third type of microorganisms are the molds. They produce obnoxious appearance and flavor in baked products.

The fungistatic materials usually employed in baked goods will inhibit the growth of all three types of microorganisms mentioned above. The inhibition of yeast fermentation is not wanted, and so the baker must extend fermentation time to obtain desirable mold protection or use very small concentrations of the fungistats. The situation is aggravated in the summer, when it is necessary to employ larger amounts of fungistatic material to overcome mold spoilage. It happens that the minimal concentration employed for desired mold inhibition may be very close to the maximal concentration of fungistat beyond which undue interference with yeast fermentation occurs.

In the preparation of baked goods, the fungistatic agent is added to the aqueous phase of the dough. The fungistat comes into direct contact with yeast and can thereby inhibit fermentation. As previously indicated, manufacturers strive to employ the fungistat in quantities which cause the least interference with fermentation, but unfortunately the amount needed to obtain the desired inhibition of subsequent mold growth causes significant interference with yeast fermentation. To date, prior art workers have moved in the direction of adding the fungistat to the aqueous phase of the dough in minimal concentrations for mold inhibition so that reduced interference wtih yeast fermentation would be realized; others are content to accept extended fermentation times resulting from direct addition of higher concentrations of the fungistat to the aqueous phase of the dough. The present invention is concerned with a method and compositions by which such disadvantages are substantially overcome; it is concerned with preferential microbiological inhibition—the use of fungistats in high concentrations to obtain the desired effective inhibition of microbiological growth in the baked products without interference with yeast fermentation during the maturation and proofing of the doughs prior to baking.

An object of this invention is to provide a novel fat composition.

Another object of this invention is to provide a novel dough in which the interference with yeast fermentation is substantially reduced despite the presence of high concentrations of fungistats.

Still another object is to provide a novel method of preparing acceptable baked goods, without seriously extending fermentation times, and yet exhibiting improved resistance to microbiological spoilage.

Other objects and advantages of this invention will become apparent from the following description and explanation thereof.

The present invention is concerned with a fat having incorporated therein a fungistat. The melting point of the fat vehicle is inversely correlated with the preferential solubility of the fungistat in fat in contrast to solubility in water. The solubility is expressed herein in terms of the distribution coefficient, which is the ratio of solubility of the fungistat in fat to that in an equal weight of water. When the fungistat has a distribution coefficient approaching infinity and of at least about 100:1, the fat vehicle has a melting point of at least 90° F. and preferably of about 90° to 105° F. from the standpoint of ease of handling in the bakery. When the distribution coefficient is greater than 2.5:1 but less than 20:1, the fat has a melting point of at least 105° F. and preferably of about 105° up to about 120° F.; this range in melting point is characteristic of solid plasticized shortenings as used in bakery operations. Where the distribution coefficient of the fungistat approaches zero or is less than 0.25:1, the fat has a melting point of at least about 120° F. and preferably of about 120° up to about 160° F. The vehicular fat in all cases is substantially moisture free, containing less than 1% by weight of water. The total composition contains less than about 4% by weight of water, based upon the moisture in the vehicular fat and the moisture contributed by the fungistat itself which may contain as much as 10% moisture.

The melting point of the fat is thus inversely correlated with the fat-solubility of the fungistat. When the fungistat is relatively more water soluble, the melting point of the fat is raised to provide more effective entrapment or shielding of the fungistat from the aqueous phase of the dough. In this way the fungistat is retained in the fat during the period of yeast fermentation so that little or no interference therewith occurs. Whereas a fungistat, which is highly soluble in fat and practically insoluble in water, may be incorporated in any fat regardless of melting point, the reverse is not possible; the water soluble fungistats must be employed with fats of proper melting point, the latter varying inversely with the distribution coefficient of the fungistat.

The concentration of fungistat in the fat is at least about 1.25% by weight and it may be as high as 30% by weight, based on the total fat composition. When the distribution coefficient of the fungistat approaches zero and is less than 0.25:1, about 5 to 30% by weight, preferably about 10 to 25% by weight, of fungistat is incorporated into the total fat composition. For fungistats having a distribution coefficient greater than about 2.5 to 1 and less than 20:1, the fungistat is present in a quantity of about 1.25 to 30% by weight, preferably about 3 to 25% by weight, based on the total fat composition. About 1.25 to 30% by weight of fungistat is used when the distribution coefficient approaches infinity and is at least about 100:1, preferably about 1.5 to 10% on the same basis.

As indicated above, the quantity of fungistat is correlated with its distribution coefficient, but in every case the amount used is greater than that employed for microbiological inhibition in fatty substances, which of themselves support such growth. It has been suggested using up to about 1% of fungistat in fatty products such as butter, containing from 15 to 19% moisture and fat with a melting point of 91 to 96° F. No prior art worker would use more than that amount for inhibiting microbial growth, because it would be wasted and the product so protected would be unpalatable when eaten as such. Furthermore, the presence of protein and buffer salts in the aqueous phase of products such as butter provides neutralizing components capable of converting fungistatic acids with distribution coefficient greater than about 2.5 to 1 and less than 20 to 1 to water soluble components with distribution coefficients of less than 0.25 to 1 and approaching zero. For this reason the melting point of butterfat is much too low, well below the 120° F. melting point required for the fungistat; consequently it fails to exhibit the desired preferential microbiological inhibition when used in yeast-raised baked products. Thus butter providing sufficient concentrations of fungistats to the dough to protect the baked product effectively against microbiological spoilage causes marked interference with yeast fermentation during the maturation and proofing of the doughs prior to baking; the very same results are obtained when the same fungistats are added directly to the aqueous phase of the doughs. The amount used in the present invention must be greater in order that the overall baked product may still have a sufficient amount of fungistat to inhibit undesired microbiological growth.

In yeast-raised white bread, fat constitutes about 3% by weight of the total flour used in making the dough and in some cases it may be as low as 1%. To obtain the desired fungistatic level in the baked product made with 3% fat, the fat must contain approximately 33 times the desired final concentration in the end item. In the bread industry, concentrations of ingredients are regularly expressed in relation to flour weight. Thus, with flour taken as 100%, the other ingredients which are used in making dough are about 60% water, about 7% sugar, about 3% yeast, about 3.5% milk powder (or its equivalent as milk) and about 2% common salt (NaCl). Minor ingredients include yeast nutrients plus oxidizing agents and are present in concentrations of less than about 1%. Our invention is applicable to any yeast-raised baked product regardless of the relative proportions of the ingredients, just so long as the fungistat will interfere with yeast fermentation.

The two commonly used methods of dough mixing employed by the baking industry are the so-called "straight dough" and "sponge dough" methods. The former is a single-step process, in which all the ingredients are mixed together in a single batch. Ordinarily, the fermentation time is about 4 to 5 hours, including that time required for the final proofing (raising of dough in baking pans). Within a given establishment, a standard fermentation time is followed closely, even though this may vary from one bakery to another due to such factors as character of flour, amount of yeast, temperature, formula ingredients, level of oxidation, etc. Variations in standard fermentation time within a given shop not only reduce efficiency in operations but also jeopardize quality and uniformity of the end-product.

The sponge dough method consists of two distinct steps, namely, the sponge stage and the dough stage. The sponge stage involves mixing part of the dough ingredients and allowing preliminary fermentation. The sponge usually comprises 50% to 75% of the total flour of the complete dough, all the yeast and yeast nutrients, and sufficient water for a moderately stiff dough. If dough conditioners and malt are employed, these are also added at this stage. Fermentation time for the sponge is usually between 3 to 4 hours, and usually does not exceed 5 hours. At the dough stage, the fermented sponge is returned to the mixer and additional ingredients are added. These include the remaining flour and water, milk solids, salt, sugar, and shortening. Fermentation time from this point on, including final proofing, ranges from 1 to 2 hours. Since the sponge method of making doughs is more flexible in continuing operations and gives bread of greater volume and more desirable grain and texture, it is by far the most popular method in use in this country. About 90% of the bread is produced this way.

A third method allowing continuous dough preparation has recently been introduced in this country. In this operation, a broth comprising sugar, yeast, salt and water is allowed to ferment, and this fermented broth is then pumped into a mixer to which are fed flour, milk solids, extra sugar, salt, oxidants and shortening. The dough is usually immediately divided and panned. Fermentation time of the dough in this operation is about 1 hour. In other operations, the dough is formed at periodic intervals in high-speed mixers and is then handled as described above for the dough in the sponge process.

The problem, which has faced the manufacturer of yeast-raised baked products, of attaining suitable resistance against microbiological spoilage without interference with yeast fermentation in the dough stage, is best illustrated by the results given below. In Table I are presented the basic dough formulae employed.

TABLE I

*Dough formulas employed in the applicants' investigation*

| Dough Process | Ingredient Identity | Parts (by weight) | Processing |
|---|---|---|---|
| Straight | Flour<br>Water<br>Sugar<br>Milk powder<br>Lard<br>Yeast<br>Salt<br>Conditioner[1] | 100<br>60<br>7<br>4<br>3<br>3<br>2<br>0.5 | Temperature, 80° F.<br>Fermentation time:<br>  First punch____ 2 hr.<br>  Second punch_ 1 hr. 10 min.<br>  To molder_____ 20 min.<br>    Total_____ 3 hr. 30 min.<br>    Proofing_____ 1 hr. 6 min.<br>Over-all,<br>    total_____ 4 hr. 36 min.<br>Baked at 450° F. for 25 min. |
| Sponge | Sponge stage:<br>  Flour<br>  Water<br>  Yeast<br>  Conditioner[1]<br>Dough stage:<br>  Flour<br>  Water<br>  Sugar<br>  Milk powder<br>  Lard<br>  Salt | 70<br>42<br>3<br>0.3<br><br>30<br>21<br>7<br>3.5<br>3<br>2 | Temperature, 78° F.<br>Fermentation time, 3 hr. 30 min.<br>Temperature, 78° F.<br>Fermentation time:<br>  To molder_____ 20 min.<br>  Proofing_____ 1 hr. 20 min.<br>    Total_____ 1 hr. 40 min.<br>Baked at 450° F. for 25 min. |

[1] Yeast food plus oxidizing agents.

In Table II below are given the results obtained with two different fungistatic materials which were dissolved in the aqueous phase of the doughs, in accordance with the present practice in the industry. Since it is known that these fungistatic materials interfere with yeast fermentation, the additives were dissolved in the water at the dough stage when the sponge method was employed. By this expedient the major portion of yeast fermentation proceeds without inhibitors being present. The fungistatic agents could not be added just prior to baking, since raising of the dough prior to molding and after panning are essential for obtaining a proper loaf of bread.

TABLE II

*Influence of fungistatic materials on yeast fermentation*

| Process | No. | Dough Fungistatic additive (percent) [1] | Proof Time [2] | Bread Measurement [3] | pH [4] |
|---|---|---|---|---|---|
| | | | Min. | In. | |
| Straight | 1 | None | 66 | 41.0 | 5.32 |
| | 2 | 0.025 SA | 68 | 41.5 | 5.35 |
| | 3 | 0.05 SA | 78 | 40.5 | 5.32 |
| | 4 | 0.10 SA | 83 | 40.5 | 5.40 |
| | 5 | 0.20 SA | 240 | 38.0 | 5.38 |
| | 6 | 0.10 SP | 66 | 41.5 | 5.32 |
| | 7 | 0.20 SP | 78 | 40.5 | 5.40 |
| | 8 | 0.40 SP | 98 | 39.0 | 5.35 |
| Sponge | 9 | None | 80 | 46.0 | 5.41 |
| | 10 | 0.025 SA | 81 | 45.5 | 5.41 |
| | 11 | 0.05 SA | 97 | 45.5 | 5.39 |
| | 12 | 0.10 SA | 125 | 44.5 | 5.39 |
| | 13 | 0.20 SA | 250 | 43.5 | 5.35 |
| | 14 | 0.10 SP | 82 | 46.0 | 5.36 |
| | 15 | 0.20 SP | 85 | 45.0 | 5.48 |
| | 16 | 0.40 SP | 104 | 44.0 | 5.52 |

[1] Percentages expressed on a flour basis. Values on a dough basis are 55% and on a bread basis 66% of the percentages listed above. SA is sorbic acid of the class of the alpha-beta unsaturated aliphatic monocarboxylic acids and SP is sodium propionate of the class of the saturated aliphatic monocarboxylic acids.
[2] 18 ounces of dough allowed to rise in the pan to the same height in the case of the straight doughs and 20 ounces in the case of the sponge doughs.
[3] Summation in inches of two perimeters of the loaf, one measured lengthwise at the center of the loaf, the other widthwise, also at the center of the loaf. (This method of expressing loaf size is commonly employed in the industry.)
[4] Of a 10% aqueous suspension.

From the results shown in Table II above it is apparent that with increasing concentration of fungistatic materials in the dough there is increasing interference with yeast fermentation and consequently longer proof time is required. Only very small concentrations of these materials, viz., 0.025% sorbic acid or 0.10% sodium propionate, expressed on the flour-weight basis, may be added without inhibiting yeast activity. The critical level at which interference with yeast activity is first noted is 0.0375% in the case of sorbic acid or 0.15% in the case of sodium propionate. Expressed in terms of a yeast-raised baked product with 3% fat in the dough, the fat would have to contain 1.25% sorbic acid or 5.0% sodium propionate to provide 0.0375% or 0.15% of the respective fungistat in the dough. With increasing concentration of the fungistatic agents, there is also noted a decrease in bread volume but, in so far as this effect is concerned, there is about a substantial increase in tolerance, viz., 0.05% sorbic acid or 0.20% sodium propionate may be tolerated. Thus, by extending the proof time of the doughs, acceptable loaves of bread may be obtained with these higher concentrations of fungistats. However, such a solution is not practical if a certain production quota is sought, unless additional proofing facilities are provided. At still higher concentrations of fungistatic material than those mentioned, increase in proofing time is not adequate to compensate for the loss in bread volume. Using a constant maturing time for the doughs prior to panning at such higher concentration, results in so-called "young" doughs, and these yield loaves of smaller volume. Extension of maturing time could correct this defect, but this adds to the inefficiency of plant operation. An increase in yeast, slightly higher dough or proof box temperature and/or a little less salt will take care of small increases in proof time but such modifications are inadequate to compensate for the interference in yeast fermentation when the higher concentrations of fungistatic materials are employed. The pH values of the bread (and of the doughs) are all of the same order of magnitude and indicate that a change in pH is not responsible for inhibition of yeast activity.

In order to follow more specifically and with less labor the action of the fungistatic agents on yeast fermentation, tests were run using the Blish-Sandstedt pressuremeter method (Cereal Laboratory Methods, 5th Edition, page 101 (1947), published by the American Association of Cereal Chemists, St. Paul, Minnesota) to measure the volume of carbon dioxide produced in terms of mm. of mercury pressure generated in the closed system at 30° C. In one series flour, water and yeast comprised the basic straight dough; in the other, 3% sugar on the flour basis was included. The results are summarized in Table III below.

TABLE III

*Gas production from straight doughs made with and without fungistatic additives*

| Series | Fungistatic additive (percent) [1] | $CO_2$ production as mm. Hg during— | | | | | | |
|---|---|---|---|---|---|---|---|---|
| | | 1st hour | 2nd hour | 3rd hour | 4th hour | 5th hour | 6th hour | Total 6 hours |
| No sugar added | None | 97 | 146 | 139 | 65 | 49 | 41 | 537 |
| | 0.025 SA | 95 | 147 | 138 | 67 | 50 | 40 | 537 |
| | 0.05 SA | 86 | 131 | 155 | 77 | 51 | 39 | 539 |
| | 0.10 SA | 57 | 74 | 94 | 101 | 85 | 62 | 473 |
| | 0.20 SA | 39 | 46 | 39 | 32 | 29 | 27 | 212 |
| | 0.10 SP | 86 | 140 | 140 | 61 | 45 | 38 | 510 |
| | 0.20 SP | 82 | 134 | 147 | 60 | 44 | 36 | 503 |
| | 0.40 SP | 52 | 70 | 88 | 95 | 79 | 54 | 438 |
| 3% sugar on the flour basis added | None | 117 | 145 | 121 | 117 | 110 | 92 | 703 |
| | 0.025 SA | 110 | 161 | 135 | 118 | 109 | 94 | 727 |
| | 0.05 SA | 92 | 164 | 146 | 130 | 118 | 85 | 735 |
| | 0.10 SA | 73 | 139 | 137 | 107 | 95 | 79 | 630 |
| | 0.20 SA | 40 | 60 | 69 | 66 | 60 | 48 | 343 |
| | 0.10 SP | 106 | 153 | 136 | 135 | 120 | 72 | 722 |
| | 0.20 SP | 101 | 154 | 136 | 132 | 111 | 70 | 703 |
| | 0.40 SP | 68 | 138 | 134 | 100 | 89 | 68 | 597 |

[1] Footnote as to Table II.

The data in Table III indicate that the fungistatic additives do not adversely affect the amylase activity of the flour so that restriction of available substrate (the sugar) for yeast fermentation is not the factor responsible for a lower rate of gas production. In the presence of added substrate, the fungistatic materials are just as effective in reducing the rate and degree of yeast fermentation. The added sugar merely promotes greater carbon dioxide gas ($CO_2$) production in all systems. With the lower concentrations of fungistatic materials, viz., up to 0.05% sorbic acid, or up to 0.20% sodium propionate, gas formation is normal by the end of the 6-hour period. Only with the lowest concentrations, 0.025% of sorbic acid and 0.10% of propionate, is $CO_2$ production unimpaired during the first hour of observation. These results indicate that only with the lowest concentration, would there be no interference with yeast activity in doughs. The somewhat higher concentrations, viz., 0.05% sorbic acid and 0.2% sodium propionate, may be employed provided sufficient fermentation time is allowed. The highest concentrations, more than 0.10% of sorbic acid and about 0.40% of sodium propionate, may not be used because of the strong inhibiting action on the rate of fermentation; available maltose and other fermentable sugars derived from the starch in the flour or from the added sucrose were not exhausted after the six hours of fermentation. These findings and conclusions agree with those obtained in the studies of the complete doughs described earlier (see Tables I and II above).

In Table IV below are presented some of the results obtained in evaluating the resistance to mold spoilage of the breads produced from the complete doughs described hereinabove. Three test methods were employed. Just after the baked breads dropped in temperature to about 100° F., loaves were sprayed on the top and sides with a suspension of mixed molds isolated from moldy bread. The spray was allowed to dry after which the loaves were placed in a Pliofilm (rubber hydrochloride) bag and incubated at 80°–90° F. In the second type of test, slices of the breads were sprayed with the mold suspension, the slices re-stacked in loaf form, and the latter stored in Pliofilm bags at 80°–90° F. In the third type of test, a slice from each bread was placed in a Petri dish, and sprayed with the mold suspension. A moistened filter paper was placed in the top cover of the Petri dish. The assembly was then stored at 80°–90° F. Examinations of the inoculated samples were made at the end of consecutive 24-hour periods; the results obtained at the conclusion of the tests are recorded in Table IV. The same relative picture of fungistatic activity was obtained at the earlier examination periods but mold growth was less.

TABLE IV

*Protection of breads against mold spoilage*

| No. | Dough Fungistatic additive [1] | Mold growth after inoculation [2] | | |
|---|---|---|---|---|
| | | Test One: On crust after 96 hours | Test Two: Between slices after 72 hours | Test Three: On exposed slices after 48 hours |
| | Percent | | | |
| 1 | None | XXX | XXXX | XXXXXX |
| 2 | 0.025 SA | XX | XXX | XXXXX |
| 3 | 0.05 SA | X | XX | XXX |
| 4 | 0.10 SA | O | O | X |
| 5 | 0.20 SA | O | O | O |
| 6 | 0.10 SP | X | XX | XXXX |
| 7 | 0.20 SP | O | X | XXX |
| 8 | 0.40 SP | O | O | X |
| 9 | None | XXX | XXXXX | XXXXXXX |
| 10 | 0.025 SA | X | XXX | XXXX |
| 11 | 0.05 SA | O | XX | XXX |
| 12 | 0.10 SA | O | X | X |
| 13 | 0.20 SA | O | O | O |
| 14 | 0.10 SP | X | XXX | XXXX |
| 15 | 0.20 SP | O | X | XX |
| 16 | 0.40 SP | O | O | O |

[1] Footnote as to Table II.
[2] See text for description of test methods; "O" means no growth; "X's" reflect degree of growth.

It will be noted from the results presented in Table IV that the extent of mold propagation was least on the crust surfaces (which have a lower moisture content) and greatest on the exposed slice stored in an environment of high humidity (Test Three). The sodium propionate was about one-third as active as the sorbic acid in inhibiting mold growth.

At the higher levels of fungistatic additives, good protection against mold spoilage was obtained. However, this coincided with the undesirable inhibition of yeast activity in the doughs (see Tables II and III above). Thus, the baker under present day practices must of necessity make a compromise; he must use sodium propionate at a level of 0.10% to 0.20% and sorbic acid at a level of 0.025% to 0.050% expressed on the flour-weight basis.

Similar tests with sodium benzoate gave results which emphasized the need for a maximal concentration that would not interfere with yeast activity in the dough and a minimal concentration required for measurable protection of the bread against mold spoilage. At a 0.2% concentration, sodium benzoate protected the bread to about the same degree as 0.2% sodium propionate, but interference with yeast activity in the dough was as great as that noted with 0.4% of the propionate. This indicates that sodium benzoate is totally unsuitable as a mold inhibitor in bread produced according to prior art practices.

Comparable studies involving inoculation of the doughs with spores of *Bacillus mesentericus*, the "rope"-producing organism, indicated that "rope" formation at 85°–90° F. was inhibited at concentrations well below that required for effective protection against mold spoilage; viz., 0.025% of sorbic acid and 0.10% of the sodium propionate being active in preventing rope development.

In the course of the investigation which resulted in the present invention, a new and novel method was discovered for incorporating fungistatic materials into yeast-raised baked products, said method providing the desired preferential (differential) microbiological inhibition. The fungistatic and bacteriostatic properties of the additives carry through into the baked products without bringing into play the undesirable effects of the additives in inhibiting yeast fermentation of the dough prior to baking. All the microorganisms of concern grow in an aqueous medium. For the inhibitors to be effective, they must be present in the aqueous phase. The novel process of the present invention comprises the inclusion of at least a major portion of the fungistatic material, or agent, in the form of a novel composition in which the fungistatic material, or agent, is incorporated into a fat ingredient of the dough. In this way reduced concentrations of the additives in the aqueous phase of the doughs is effected thereby minimizing interference with yeast fermentation.

It has been discovered that during the baking operation the melting of the fat will release the fungistatic material from the fat permitting it to dissolve into the hot aqueous phase. With some forms of the fungistatic materials, viz., the free carboxylic acids or their alkyl esters, their release from the fat is accelerated by the property of these forms of the fungistatic acids to sublime or volatilize from the fat at elevated baking temperatures, and the increased solubilities of these materials (particularly the free acids) in hot water. With the non-volatile forms of the additives, viz., the alkali-metal or alkaline earth metal salts of the fungistatic acids, such as the sodium or calcium salts, respectively, extraction from the liquefied fats into the aqueous phase is favored by the elevated temperatures encountered during baking. Sublimation of the volatile fungistatic acids from the fat into the aqueous phase during baking is surprisingly not associated with a measurable loss of the fungistatic acids. Apparently, the skin crust formed during the first stage of baking is adequate for "locking in" the volatile fungistatic acids.

The results shown in Tables II and III demonstrate that a fungistat of the alpha-beta unsaturated aliphatic monocarboxylic acid does not interfere with yeast fermentation until a concentration greater than 0.025%, based on flour, is reached, whereas a concentration greater than 0.10% is needed for a saturated aliphatic monocarboxylic acid.

As mentioned earlier in this specification, the present invention is concerned with fats of specific melting points having incorporated therein fungistats of specific distribution coefficients (the ratio of solubility of the fungistat in fat to that in an equal weight of water).

When a fat of high melting point is employed, such as completely hydrogenated cottonseed oil having a melting point of about 140° F., or glyceryl monostearate with a melting point of about 155° F., the melted fat with fungistatic material in suspension and/or in solution is preferentially spray chilled to form small beads. These small beads are desirably of such size that practically all beads will pass through a #20 mesh sieve and practically all beads will be retained over a #80 mesh sieve. The purpose in employing the high melting fats in bead form as the vehicular material is to enhance uniform dispersion of the fungistatic agents throughout the bread during baking.

It is possible to subdivide a block of high melting vehicular fat material containing the fungistatic agents by grinding or flaking, but this is not the preferred method. It is more desirable to add as much fungistatic agent as possible to the fatty vehicular material even though most of the agent is not dissolved in the fat, but is suspended instead. When the resulting fat containing the fungistatic agent is spray chilled, all suspended particles of fungistatic agent are coated with the fat. On the other hand, when a solid block of such fatty composition is subjected to grinding or flaking, there may be a tendency for fracture to occur at the interface between the fat-insoluble fungistatic agent and the fat, leaving the fungistat exposed. Even when the fungistatic agent is completely in solution, there is a preference for the spray chilled beads, since spheres have less surface than any other form of particles. Reduced surface area is desirable to minimize aqueous extraction of fungistatic agent from the vehicular material during the preparation and fermentation of the yeast-raised doughs. This is particularly true when high-melting fats, which are somewhat dispersible in water, are employed, viz., glyceryl monostearate obtainable with or without accompanying small amounts of glyceryl distearate.

In Table V below are given a number of examples to illustrate the preferred ways of preparing the fungistatic concentrates of this invention. The latter concentrates provide means for preferential (or differential microbiological inhibition in the manufacture and distribution of yeast-raised products; there occurs no interference with yeast fermentation during the maturation and handling of doughs prior to baking, but full fungistatic activity is realized in protecting the baked products against subsequent microbiological spoilage.

TABLE V

*Fungistatic concentrates for preferential microbiological inhibition*

| Example | Fungistatic agent | | Fat Vehicle | | | Fungistatic agent in vehicle, percent |
|---|---|---|---|---|---|---|
| | Compound | Distribution Coefficient [1] | Identity | Melting Point, °F. | Form | |
| 1 | Ethyl Sorbate. | More than 100. | Lard | 102 | melted | 5.0 |
| 2 | Sorbic Acid. | 3.0 | Hydrogenated Vegetable Oil. | 112 | plasticized | 5.0 |
| 3 | ---do--- | 3.0 | ---do--- | 140 | beads | 25.0 |
| 4 | ---do--- | 3.0 | Glyceryl monostearate. | 155 | ---do--- | 25.0 |
| 5 | Calcium Propionate. | Less than 0.25. | Hydrogenated Vegetable Oil. | 140 | ---do--- | 25.0 |
| 6 | ---do--- | Less than 0.25. | Glyceryl monostearate. | 155 | ---do--- | 25.0 |
| 7 | Benzoic Acid. | 6.1 | Hydrogenated Vegetable Oil. | 112 | plasticized | 5.0 |
| 8 | ---do--- | 6.1 | ---do--- | 140 | beads | 25.0 |
| 9 | Sodium Benzoate. | Less than 0.25. | Glycerol monostearate. | 155 | ---do--- | 25.0 |

[1] The ratio of solubility of the fungistat in fat to that in an equal weight of water.

The alkyl esters of the fungistatic aliphatic carboxylic acids employed by the present invention are so highly soluble in fats and oils and have such a low degree of solubility in water that they may be incorporated directly in solution in the melted fats employed in dough manufacture. Sorbic acid is soluble to only a 0.6% concentration in fats and to only a 0.2% concentration in water at room temperature. This fungistatic agent should be desirably added to a fat having a melting point of about 105° to 120° F. Propionic acid and its sodium or calcium salts are so highly soluble in water (distribution coefficients approaching zero), that they should be added only to fats of high melting point, i.e., from 120° to 160° F., to form suspensions of the fungistatic agents in the fats. The same applies to sodium benzoate. Free benzoic acid, on the other hand, is much more soluble in fat than in water (distribution coefficient of 6.1) at room temperature so that it may be incorporated in fats of lower melting point. Both sorbic and benzoic acids may also be suspended in beads of the fats of high melting point.

It is to be emphasized that moisture-free fats cannot support mold or bacterial growth since they contain no moisture in solution or in emulsified form. Thus, the addition of the fungistatic agents does not improve the resistance of the fats per se to mold spoilage. For this reason fungistatic agents have hitherto never been added to moisture-free fats. The supplemented fats of this invention are fungistatic concentrates which are capable, when incorporated into an aqueous medium that is subsequently subjected to heat processing, of liberating the fungistatic agent to the aqueous phase, thereby protecting the end-product against mold and/or bacterial spoilage.

Among the fungistatic agents contemplated for use in the present invention are the carboxylic acids, their alkyl esters, such as the methyl, ethyl and propyl, etc., esters, and their alkali-metal and alkaline earth metal salts, such as the sodium and calcium salts, respectively. The acids, esters and salts may be referred to in a generic sense for the purpose of this specification and the appended claims as the "carboxylic acid compound." Included among these carboxylic acids are the saturated lower aliphatic acids, including propionic and diacetic acids and the alpha-beta unsaturated carboxylic acids of the following formula:

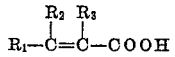

wherein that portion of the molecule containing the alpha-beta unsaturation may be either an aliphatic or aromatic hydrocarbon group. Where more than one unsaturated carbon to carbon linkage exists in the molecule, such unsaturation should be part of a conjugated double bond system with the alpha-beta carbon to carbon unsaturation. In the formula above, $R_1$ is hydrogen when $R_2$ and $R_3$ combine to complete a single carbocyclic nucleus; $R_1$ is a carbon atom of an aliphatic hydrocarbon group when $R_2$ and $R_3$ are hydrogen atoms. Examples of such acids are: crotonic, isocrotonic, beta-ethylacrylic, dimethylacrylic, alpha-hexenoic, sorbic, benzoic and para-hydroxybenzoic acids, etc.

One desirable group of fungistatic agents which is satisfactory are those acids having the following general formula:

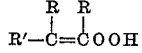

wherein R represents a hydrogen atom or an alkyl group, R' represents an aliphatic hydrocarbon radical. Among these acids are: sorbic, alpha-hexenoic, crotonic, isocrotonic, beta-ethylacrylic and dimethylacrylic acids.

The lower alkyl esters and the sodium and calcium salts of the above carboxylic acids may also be employed satisfactorily.

The fungistats in the form of the alkyl esters contemplated for use in the present invention have distribution coefficients approaching infinity and are at least 100:1. The unsaturated carboxylic acids with fungistatic activity have distribution coefficients greater than about 2.5:1 and less than 20:1. The sodium and calcium salts of the fungistatic acids and the saturated lower aliphatic acids (as the free acids) have distribution coefficients approaching zero and are less than 0.25:1.

In Table VI below are presented results obtained with the examples of Table V relative to the extent of their interference with yeast fermentation in doughs. For comparative purposes, control systems were also included wherein the fungistatic agents were added directly to the aqueous phase in preparing the dough, as is the current prior art practice.

TABLE VI

*Reduction in interference with yeast fermentation in straight doughs made with 3% added sugar, when the fungistatic agents are employed in the form of the concentrates of this invention*

| Example | Fungistatic additive (percent)[1] | $CO_2$ production as mm. Hg during— | | | | | | |
|---|---|---|---|---|---|---|---|---|
| | | 1st hour | 2nd hour | 3rd hour | 4th hour | 5th hour | 6th hour | Total 6 hours |
| Control a | None | 119 | 134 | 117 | 122 | 112 | 74 | 678 |
| Control b | 0.10 SA in water | 69 | 103 | 112 | 107 | 63 | 48 | 502 |
| 1 | 0.125 ES[2] in fat | 120 | 133 | 123 | 118 | 110 | 75 | 679 |
| 2 | 0.10 SA in fat | 100 | 130 | 110 | 115 | 110 | 64 | 629 |
| 3 | 0.10 SA in fat | 118 | 150 | 120 | 120 | 104 | 67 | 679 |
| 4 | 0.10 SA in fat | 116 | 148 | 120 | 112 | 98 | 66 | 660 |
| Control c | 0.40 CP in water | 75 | 145 | 129 | 82 | 50 | 38 | 519 |
| 5 | 0.40 CP in fat | 118 | 152 | 127 | 114 | 87 | 62 | 660 |
| 6 | 0.40 CP in fat | 113 | 153 | 134 | 107 | 78 | 60 | 645 |
| Control d | 0.20 SB[3] in water | 70 | 159 | 140 | 79 | 50 | 36 | 534 |
| 7 | 0.17 BA in fat | 95 | 140 | 134 | 102 | 75 | 60 | 606 |
| 8 | 0.17 BA in fat | 112 | 142 | 121 | 112 | 108 | 70 | 665 |
| 9 | 0.20 SB[3] in fat | 105 | 146 | 126 | 90 | 75 | 68 | 610 |

[1] ES=ethyl sorbate; SA=sorbic acid; CP=calcium propionate; SB=sodium benzoate; BA=benzoic acid. For a description of the fungistatic concentrates, see Table V, as the fungistatic concentrates correspond to the examples shown in Table V. The concentrations listed are expressed on the flour-weight basis.
[2] Equal to 0.10% SA.
[3] Equal to 0.17% BA.

In this series of tests the marked inhibitory effect on yeast fermentation with a 0.10% concentration (expressed on the flour-weight basis) or sorbic acid in water is again noted (Control b versus Control a). When the sorbic acid is made insoluble in water by converting it to ethyl sorbate and dissolving an equivalent quantity of this in the melted fat, no interference with yeast activity occurs (see Example 1). Free sorbic acid in the fat at the 0.10% concentration level (see Example 2) exhibits about the same degree of inhibition noted when 0.05% is added directly to the aqueous phase of the dough. This means that 0.10% sorbic acid in plasticized fat may be employed in doughs provided there is an adjustable increase in proof time. No inhibitory effect on yeast fermentation is noted when 0.10% of sorbic acid in either of the high melting fats (see Examples 3 and 4) (see also Table V) is added to the doughs. Thus, with no change in fermentation times, such concentrates may be employed to supply 0.1% sorbic acid. Similar tests with 0.20% of sorbic acid added to the doughs have demonstrated no interference with yeast activity when completely hydrogenated fat is the vehicular material employed in preparing the beads. When glyceryl monostearate is employed for this purpose, 0.20% of sorbic acid may exhibit a small inhibitory effect on yeast fermentation. This is noted when the beads are of 50 to 70 mesh in size, but not when they are 20 to 30 mesh. Apparently the smaller the bead prepared with a vehicular material exhibiting some dispersibility in water, the greater is the tendency for inhibition of yeast activity. But even in these latter cases, minor compensation can be made for the inhibitory effect by extending the proof time.

The test results with calcium propionate support those obtained with sorbic acid. Propionic acid in the low melting fats in a concentration equivalent to that of 0.40% calcium or sodium propionate may not be employed because of its high degree of solubility in water, for it is readily extracted from the fat by the water in the dough. For this reason, calcium or sodium propionate may be added in 0.40% concentration in dough manufacture, only when the high melting fats (see Examples 5 and 6) are employed as the vehicular material to prepare the beads.

In the case of benzoic acid and its derivates, such as para-hydroxybenzoic acid, the use of the free acid in the plasticized fat (see Example 7) circumvents in a large measure the inhibitory effect on yeast fermentation of the readily water-soluble sodium benzoate dissolved in the aqueous phase of the dough (Control d) in equivalent concentration. When a high melting fat is employed as the vehicular material to make beads containing free benzoic acid (see Example 8) no interference with yeast activity is noted. The readily water-soluble sodium benzoate in the slightly water-dispersible glyceryl monostearate (see Example 9) exhibits some inhibitory effect on yeast fermentation, but to a much lesser degree than when the same concentration of sodium benzoate is dissolved in the aqueous phase of the dough.

The presence of the small concentrations of vehicular materials (the fats) in the doughs has no effect on yeast fermentation. Control tests conducted on doughs containing the same amounts of the vehicular materials but without added fungistatic agents gave the same results as the control made without added fat and without fungistatic additives.

The data in Table VII below show to what degree preferential (or differential) microbiological inhibition in bread manufacture is attainable by the fungistatic concentrates of this invention.

TABLE VII

*Attainment of preferential microbiological inhibition in bread manufactured with the fungistatic concentrates of this invention—sponge dough process*

| Example | Fungistatic additive (percent)[1] | Proof Time | Bread measurement[4] | Mold growth[5] |
|---|---|---|---|---|
| | | Min. | In. | |
| Control a | None | 78 | 45.0 | XXXXX |
| Control b | 0.10 SA in water | 121 | 43.0 | X |
| 1 | 0.125 ES[2] in fat | 79 | 45.0 | XX |
| 2 | 0.10 SA in fat | 94 | 44.5 | X |
| 3 | 0.10 SA in fat | 77 | 45.0 | X |
| 4 | 0.10 SA in fat | 80 | 45.5 | O |
| Control c | 0.40 CP in water | 100 | 43.0 | O |
| 5 | 0.40 CP in fat | 76 | 45.0 | X |
| 6 | 0.40 CP in fat | 79 | 45.5 | O |
| Control d | 0.20 SB[3] in water | 108 | 43.0 | XX |
| 7 | 0.17 BA in fat | 88 | 44.5 | XX |
| 8 | 0.17 BA in fat | 78 | 45.0 | XXX |
| 9 | 0.20 SB[3] in fat | 83 | 44.5 | XX |

[1,2,3] Same footnotes as to Table VI; same examples as in Table V.
[4] See footnote to Table II.
[5] Same series of tests conducted as listed in Table IV. Values reported in this table are averages of results of the three tests, with "X's" reflecting degree of growth and "O" no growth after inoculation.

With ethyl sorbate in the melted lard (see Example 1) no interference with yeast activity occurs; fairly good inhibition of mold growth following deliberate inoculation is attained. The alkyl esters of the fungistatic acids, encompassed by the present invention, and ethyl sorbate is representative of the group, are however not the preferred components for the fungistatic concentrates.

Sorbic acid in the plasticized shortening (see Example 2) still exhibits a small inhibition of yeast fermentation, but much less than that which occurs with free sorbic acid dissolved in the aqueous phase of the dough; mold spoilage of bread containing this concentrate is effectively retarded. Sorbic acid in the completely hydrogenated fat (see Example 3) or in the glyceryl monostearate (see Example 4) are very good examples of preferential microbiological inhibiting compositions; no effect on yeast activity, but very good inhibition of mold growth. Indeed, up to 0.2% sorbic acid may be added to doughs when the fats of high melting point are the vehicular materials, with no significant interference with yeast activity and with a gain in resistance of the bread to mold spoilage.

With the calcium propionates in the fats of high melting point (see Examples 5 and 6) good differential microbiological inhibition is attained.

With the benzoic acid and sodium benzoate preparations (see Examples 7–9), a fairly good reduction in interference with yeast fermentation is obtained. The greater susceptibility of the resulting breads to mold spoilage is nothing more than a reflection of the inferiority of sodium benzoate as a fungistatic agent at 0.2% concentration when compared with 0.4% calcium propionate or 0.10% sorbic acid.

In a comparable study using straight doughs, substantially the same picture of preferential microbiological inhibition was obtained with the same series of examples. The investigation was also extended to a study of doughs inoculated with spores of *Bacillus mesentericus*; effective inhibition of rope formation was obtained with the same series of examples employed at the same concentrations.

Glyceryl monostearate is preferred as the fat employed over completely hydrogenated fat when fats of high melting point are used as the vehicular material for the fungistatic agents. Completely hydrogenated fat exhibits no shortening value and therefore only adds to the cost of the fungistatic concentrates. Glyceryl monostearate is commonly added to doughs as an anti-staling additive to impart to the bread a softness which is retained over a longer period of time. The glyceryl monostearate in bead form containing the fungistatic agents still acts as an anti-staling agent even though not to the same degree as the monostearate dissolved in the fat component of the dough. Thus, there is some compensation for the cost of the glyceryl monostearate when the latter is employed in making the fungistatic concentrates of this invention.

Other advantages over and above preferential microbiological inhibition reside in incorporating the fungistatic agents in fats for use in making doughs. The fungistatic agents per se are now available to the baker in relatively pure form. When used as pure chemicals, they pose a problem. The compounds are used in such small amounts, that special sensitive scales are frequently required to control the addition of the correct quantity to the doughs. By incorporating the fungistatic agent in proper concentration in the shortenings customarily used by the baker, there are eliminated two steps in dough preparation, the weighing of the fungistatic additive and the dissolving of it in the aqueous phase. For flexibility in use, concentrates of fungistatic agents suspended and dissolved in fat up to 25% by weight can be prepared. This furnishes the baker flexibility in using any desired concentration of fungistatic agent in keeping with product and seasonal requirements. This is accomplished by blending, during dough manufacture, of the fungistatic fat with the ordinary fat conventionally used and which does not contain any fungistatic agent.

The terms "fungistatic" and "mold inhibiting" agent or material employed in this specification are not used in the narrow sense of preventing mold growth but are used generically to include substances that may either retard or prevent such growth. The terms also encompass the bacterial inhibiting properties of these substances. The terms "microbiological materials and "microorganisms" are also employed in their generic sense and are intended to include a number of bacterial species, as well as fungi.

The term "fungistatic fat" is intended to refer to the novel concentrates or compositions of a fat containing a fungistatic agent. The term "fat" is used in its usual sense and includes esters and mixtures of esters of glycerol with fatty acids; both saturated and unsaturated. The term includes mono-, di-, and tri-esters of glycerol.

We claim:

1. An edible fat composition containing a water soluble fungistat which interferes with yeast fermentation and which has a distribution coefficient of less than 0.25:1, said fungistat being employed with a fat having a melting point of at least 120° F. in an amount of about 5 to 30% by weight of said fat composition.

2. An edible fat composition containing a water soluble fungistat which interferes with yeast fermentation and which has a distribution coefficient of less than 0.25:1, said fungistat being incorporated in a substantially moisture free fat having a melting point of at least 120° F. in an amount of about 5 to 30% by weight of said fat composition.

3. The composition of claim 2 wherein the fungistat is a saturated aliphatic carboxylic acid compound.

4. An edible fat composition in particulate form comprising sorbic acid as a fungistat which interferes with yeast fermentation incorporated in a fat which is substantially moisture free and which has a melting point of about 120°–160° F., said fungistat being present in a concentration of about 5 to 30% by weight of said fat composition.

5. An edible fat composition in particulate form comprising sodium propionate as a fungistat which interferes with yeast fermentation incorporated in a fat which is substantially moisture free and which has a melting point of about 120–160° F., said fungistat being present in a concentration of about 5 to about 30% by weight of said fat composition.

6. The process of manufacturing yeast-leavened farinaceous baked products which comprises incorporating into a yeast-containing dough a fat composition in particulate form and containing a fungistat which interferes with yeast fermentation, said fungistat being present in a concentration of from about 5 to 30% by weight of said fat composition and about 0.1% to 0.4% based on the weight of flour, and having a distribution coefficient of less than 0.25:1, said fat having a melting point of at least 120° F., and baking the dough at a temperature at which the fat melts thereby releasing the fungistat for solution in the aqueous phase of the bread.

7. The process of claim 6 wherein the fungistat is a saturated aliphatic carboxylic acid compound.

8. The process of claim 6 wherein the fungistat is sodium propionate.

9. The process of manufacturing yeast-leavened farinaceous baked products which comprises incorporating into a yeast-containing dough a fat composition in particulate form and containing a fungistat which interferes with yeast fermentation, said fungistat being present in concentration of about 5 to 30% by weight of said fat composition and about 0.025 to 0.2% based on the weight of the flour, and having a distribution coefficient of less than 20:1 but greater than 2.5:1, said fat having a melting point of at least 120° F., and baking the dough at a temperature at which the fungistat volatilizes and spreads throughout the resultant product.

10. The process of manufacturing yeast-leavened farinaceous baked products which comprises incorporating into a yeast-containing dough a fat composition having a fungistat which ordinarily interferes with yeast fermentation incorporated therein, said fungistat being selected from the group consisting of a fungistat with a distribution coefficient of less than 20:1 but greater than 2.5:1, and a fungistat with a distribution coefficient of less than 0.25:1, the fungistat with the distribution coefficient of less than 20:1 but greater than 2.5:1 having been added in a vehicular fat ingredient of melting point of at least 105° F. and containing the fungistat in an amount of about 1.25 to 30% by weight of said fat composition and about 0.025 to 0.2% based on the weight of the flour; the fungistat with the distribution coefficient of less than 0.25:1 having been added in a vehicular fat ingredient of melting point of at least 120° F. and containing the fungistat in an amount of about 5 to 30% by weight of said fat composition and about 0.1% to 0.4% based on the weight of the flour, and baking the dough at a temperature at which the fungistat volatilizes and spreads throughout the resultant product.

11. The process of claim 10 wherein the fungistat is an alpha-beta unsaturated aliphatic mono-carboxylic acid compound.

12. The process of claim 10 wherein the fungistat is sorbic acid.

13. A farinaceous yeast-raised dough containing dispersed therethrough a fat composition having a fungistat which ordinarily interferes with yeast fermentation incorporated therein, said fungistat being selected from the group consisting of a fungistat with a distribution coefficient of less than 20:1 but greater than 2.5:1, and a fungistat with a distribution coefficient of less than 0.25:1, the fungistat with the distribution coefficient of less than 20:1 but greater than 2.5:1 having been added in a vehicular fat ingredient of melting point of at least 105° F. and containing a fungistat in an amount of about 1.25 to 30% by weight of said fat composition and about 0.025 to 0.2% based on the weight of the flour; the fungistat with the distribution coefficient of less than 0.25:1 having been added in a vehicular fat ingredient of melting point of at least 120° F. and containing the fungistat in an amount of about 5 to 30% by weight of said fat composition and about 0.1% to 0.4% based on the weight of the flour, and thereby preventing interference with yeast fermentation in said dough.

14. A farinaceous yeast-raised dough containing dispersed therethrough an edible fat composition in particulate form comprising a fungistat which interferes with yeast fermentation incorporated in a fat which is substantially moisture free and which has a melting point of about 120°–160° F., said fungistat being selected from the group consisting of a fungistat with a distribution coefficient of less than 20:1 but greater than 2.5:1, and a fungistat with a distribution coefficient of less than 0.25:1, said fungistat being present in a concentration of about 5 to about 30% by weight of said fat composition.

15. A farinaceous yeast-raised dough having dispersed therethrough a fat composition comprising an alpha-beta unsaturated aliphatic mono-carboxylic acid compound as a fungistat which ordinarily interferes with yeast fermentation and which has a distribution coefficient of less than 20:1 but greater than 2.5:1 incorporated in a vehicular fat ingredient having a melting point of at least 105° F., said fungistat being present in an amount of about 1.25 to about 30% by weight of said fat composition and about 0.025 to 0.2% by weight based on the weight of the flour thereby preventing interference with yeast fermentation in said dough.

16. A farinaceous yeast-raised dough having dispersed therethrough a fat composition comprising a saturated aliphatic carboxylic acid compound as a fungistat which ordinarily interferes with yeast fermentation and which has a distribution coefficient of less than 0.25:1 incorporated in a vehicular fat ingredient having a melting point of at least 120° F., said fungistat being present in an amount of about 5 to 30% by weight of said fat composition and about 0.1% to about 0.4% by weight based on the weight of the flour thereby preventing interference with yeast fermentation in said dough.

17. A farinaceous yeast-raised dough having dispersed therethrough a fat composition comprising sorbic acid as a fungistat which ordinarily interferes with yeast fermentation incorporated in a vehicular fat ingredient having a melting point of at least 105° F., said fungistat being present in an amount of about 1.25 to 30% by weight of said fat composition and about 0.025 to 0.2% based on the weight of the flour thereby preventing interference with yeast fermentation in said dough.

18. A farinaceous yeast-raised dough having dispersed therethrough a fat composition comprising sodium propionate as a fungistat which ordinarily interferes with yeast fermentation in a vehicular fat ingredient having a melting point of less than 120° F. in an amount of about 5 to about 30% by weight of said fat composition and about 0.1 to about 0.4% based on the weight of the flour thereby preventing interference with yeast fermentation in said dough.

References Cited in the file of this patent

UNITED STATES PATENTS

| Number | Name | Date |
|---|---|---|
| 2,132,436 | Reynolds | Oct. 11, 1938 |
| 2,145,016 | Spaulding | Jan. 24, 1939 |
| 2,154,449 | Hoffman et al. | Apr. 18, 1939 |
| 2,236,867 | Bunzell | Apr. 1, 1941 |
| 2,271,756 | Bauer et al. | Feb. 3, 1942 |
| 2,379,294 | Gooding | June 26, 1945 |
| 2,412,596 | Bauer et al. | Dec. 17, 1946 |
| 2,474,228 | Coleman et al. | June 28, 1949 |
| 2,586,274 | Tollenaar | Feb. 19, 1952 |
| 2,689,797 | Joffee | Sept. 21, 1954 |

FOREIGN PATENTS

| Number | Country | Date |
|---|---|---|
| 501,871 | Canada | Apr. 27, 1954 |